Feb. 28, 1933. A. BECKER 1,899,660
REEL FOR MEASURING LINES
Filed May 14, 1930 2 Sheets-Sheet 1
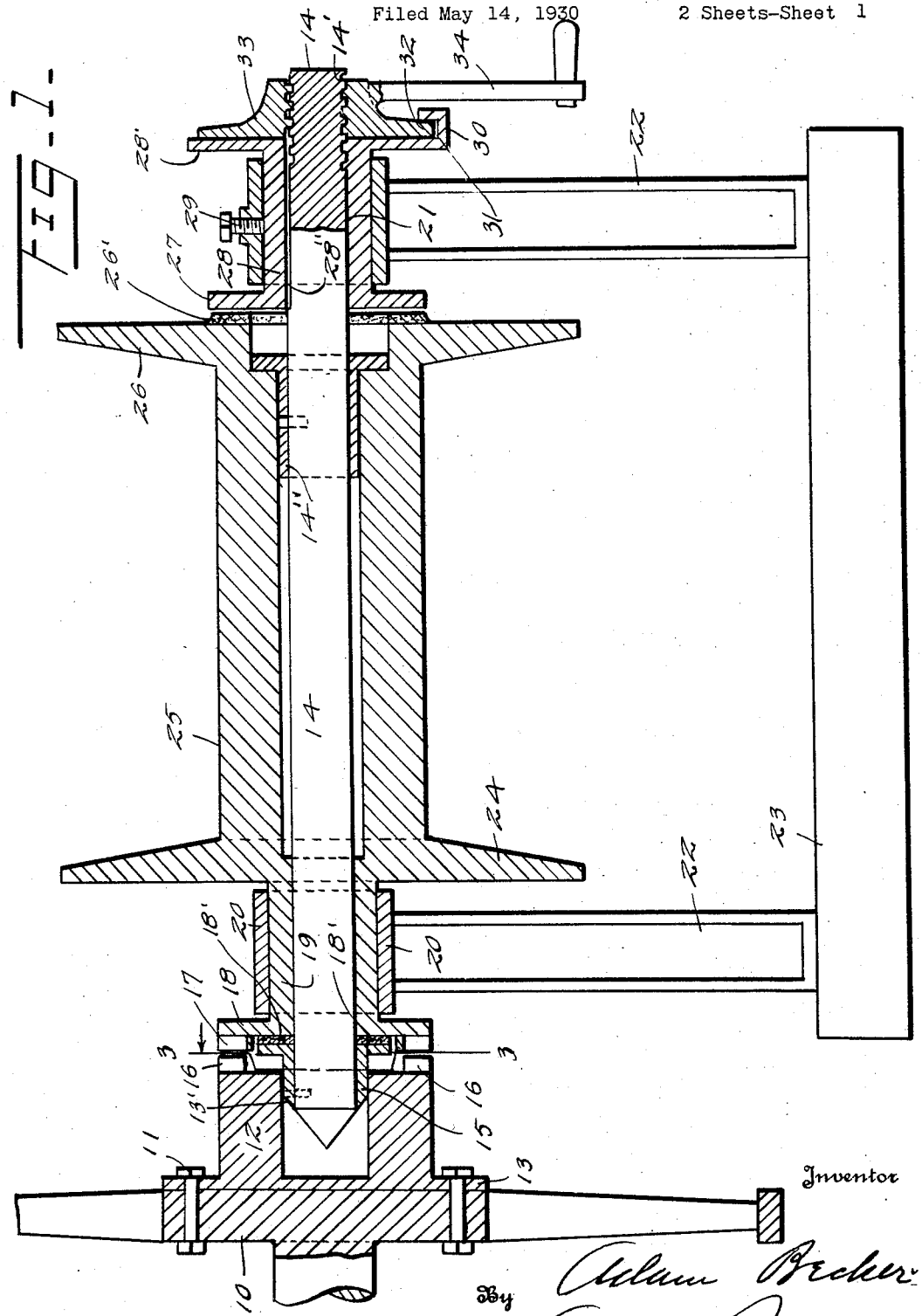
Inventor
Adam Becker
By Adrian [illegible] Attorney Feb. 28, 1933.   A. BECKER   1,899,660
REEL FOR MEASURING LINES
Filed May 14, 1930   2 Sheets-Sheet 2
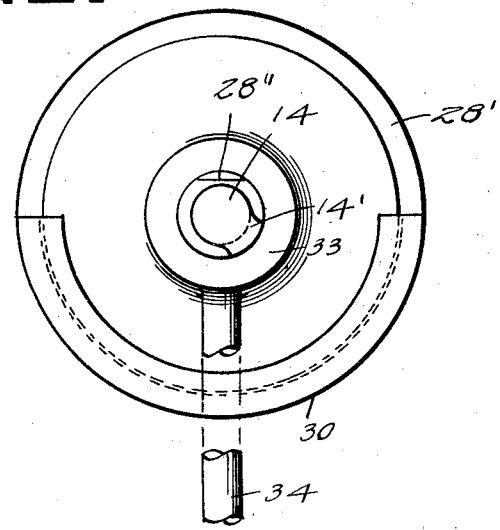
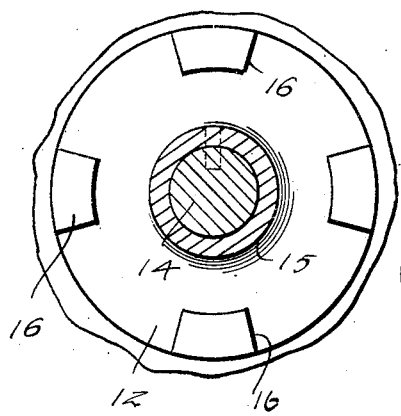
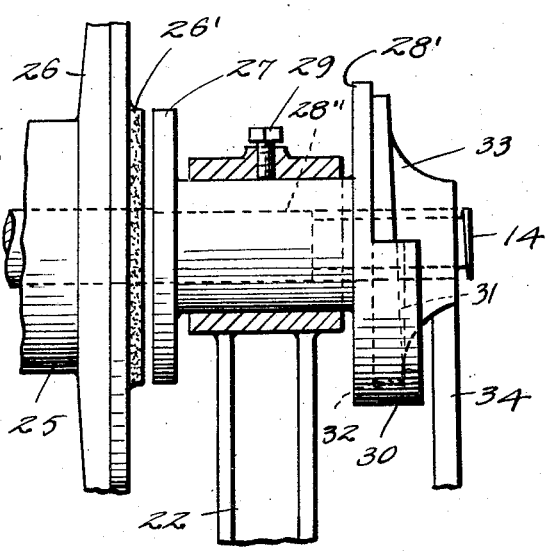
Adam Becker, Inventor
By Adrian _____
  ___ Attorney Patented Feb. 28, 1933

1,899,660

UNITED STATES PATENT OFFICE

ADAM BECKER, OF KANE, PENNSYLVANIA, ASSIGNOR OF ONE-FOURTH TO H. HOLLINGSWORTH, OF KANE, PENNSYLVANIA

REEL FOR MEASURING LINES

Application filed May 14, 1930. Serial No. 452,328.

The object of this invention is to provide a clutch, combined with cable winding means and braking devices, and adapted for controlling the line or cable by means of which the tool employed in well drilling operations is handled.

A further object is to provide a plurality of braking devices for the drum or cable winding means, one of these devices gradually engaging, upon the initial movement of the clutch to inoperative position, and the other braking device becoming effective immediately thereafter—frictional engagement being secured by the use of a brake handle which also serves in the reverse movement thereof to release all of the braking devices and simultaneously advance the movable element of the clutch to engaging position.

With the foregoing and other objects in view, the invention consists in the novel construction and arrangement of elements disclosed and claimed, it being understood that modifications and alterations may be made within the scope of the claims without departing from the spirit of the invention.

In the drawings forming part of this application,

Figure 1 is a view in longitudinal section through the spool or drum controlling the line extending into the bore being drilled,—the view including also the elements of the clutch and braking means.

Figure 2 is a detail view showing the grooved element at the right of Figure 1, and the proportions of the flange in which a groove is formed for engagement in a given position of the winding drum, by the threaded element on the shaft, when advanced by the crank handle.

Figure 3 is a section on line 3—3 of Fig. 1.

Figure 4 is a fragmentary view, in elevation and section, and shows the structure on opposite sides of the bearing at the right of Fig. 1.

A fly wheel is designated 10, and connected with the hub portion thereof by bolts 11 is a clutch element 12 having an outer flange 13 through which the bolts pass. A bore 13' in the socket may be tapered at its inner end, and the end portion of shaft 14 enters the bore, being movable longitudinally therein as indicated below.

A flanged sleeve 15 is keyed or made rigid with reference to this portion of the shaft 14, and the greatest diameter of the sleeve exclusive of its flange corresponds with the diameter of bore 13'. Clutch teeth 16 on element 12 are engaged by teeth 17 on the flange 18 of sleeve 19 rotatable with spool 25.

Bearings such as 20 are carried by elements 22 rising from the base 23, and the sleeve 19 is received by bearing 20, being rotatable therein and movable longitudinally. In Figure 1 the right end of sleeve 19 joins the flange 24 of spool or drum 25, and clutch teeth 17 may be disengaged from teeth 16 by the operating means described below, when shaft 14 moving to the right produces engagement between sleeve 15 and a friction disk 18' on flanged sleeve 19. Retarding movement is produced, and sleeve 19 shifts the spool 25 to the position of Figure 1. In this released position, the line or cable assumed to be wound on the spool, may be manipulated as desired.

Slight movement of the spool 25 toward the right (from the position of Fig. 1), by crank 34, shaft 14, fixed sleeve 15, and elements 18, 19, will produce engagement between flange 26 of the spool and its friction disk 26', and flange 27 on sleeve 28 rotatable in bearing 21. However, a set screw 29 will prevent this rotation when desired, so that spool 25 can not be shifted longitudinally and release the clutch, for example.

Sleeve 28 also has a flange 28' in the form of a disk, and the edge of this flange is itself flanged at 30. The portion last named may extend about half way around disk member 28', and a groove on the inner portion thereof, designated 31, is engaged by the edge 32 of annular member 33 when the clutch teeth 16, 17 are disengaged and before engagement takes place at 26' 27. The edge 32 is of gradually increasing thickness, circumferentially, and the thinner portion is first engaged, and thereafter the portion of greater thickness, so that an initial braking action becomes gradually effective while there is still space at 26' 27 assuming that screw 29 is released.

In releasing the clutch, therefore, there need be no preliminary slipping prior to full braking action at 26' 27.

One end of shaft 14 is threaded at 14', and annular element 33 has a threaded bore engaged by the threads of the shaft. The rotation of element 33 by a crank handle or lever 34 is effective through the construction specified for throwing in the clutch at 16, 17 and simultaneously releasing all braking means; and the rotation of the element 33 in the other direction throws out the clutch and produces initial braking action at 30, 32, and full braking action at 26' 27, if sleeve 28 is held by set screw 29.

In the clutch-engaging operation, flanged sleeve 14" fixed on shaft 14 engages the wall at the right hand recessed end of spool 25, producing thrust toward the left in Figure 1, and shaft 14 then slides in bearings such as 21, but does not rotate because of complementary flat surfaces at 28" (on the shaft and in the bearing).

In the release of the clutch by sliding movement of the shaft in the other direction, engagement takes place between flanged sleeve 15 and friction disk 18' on sleeve 19. Sleeve 19 controls one set of clutch teeth, and is rigid with spool 25, sleeve 15 being rigid with shaft 14, as stated.

What I claim is—

1. In a device of the class described, a shaft, a rotatable element including clutch teeth, a sleeve movable by the shaft into engagement with said teeth, a spool mounted on the shaft, friction devices active in successive separate stages, said friction devices being positioned beyond one end of the spool and surrounding the shaft, and rotatable means for moving the shaft longitudinally of its axis, in both directions, one rotatable movement producing engagement of the sleeve and clutch to the exclusion of the friction devices, and movement in the opposite direction producing reverse relative position of the clutch and friction devices.

2. A construction including the elements of claim 1 cooperating as there specified, in which the friction devices include elements engaging in a circumferential direction, along inclined frictional surfaces.

3. A construction including the elements of claim 1, in which the friction devices comprise elements engaging with an initial braking action along inclined surfaces, and further comprise friction elements coming into engagement at the close of said initial braking action and upon release of the clutch.

4. In a device of the class described, a shaft, a spool mounted on the shaft, a rotatable element including clutch teeth, a sleeve including teeth and slidable for producing engagement with the teeth first named, for rotating the spool, an element threaded on to the shaft, a second sleeve, grooved at one end portion and having a bore through which the shaft passes, and means for retaining and releasing the second sleeve with reference to a stationary element, the threaded element and spool being movable into engagement with opposite end portions of the second sleeve, this movement causing engagement between the threaded element and groove, during rotation of the threaded element in a direction for releasing the clutch teeth.

5. In a device of the class described, a shaft, a spool mounted on the shaft, cooperating clutch elements controlled by longitudinal movement of the shaft and acting to retain and release the spool with reference to rotary movement, a flanged sleeve through which the shaft passes, means for retaining and releasing the sleeve with reference to a stationary element, the flange of the sleeve including a segmental element having a groove therein, and an element threaded on to the shaft and having a segmental edge portion with a surface inclined circumferentially for cooperation with a wall of the groove.

6. A brake comprising an annular flanged element having an inner segmental channel therein, and a rotary annular member concentric with the element first named and having an edge portion of gradually increasing thickness for cam-like engagement with the walls of the channel.

In testimony whereof I have affixed my signature.

ADAM BECKER.